United States Patent [19]

Costemalle et al.

[11] 3,962,018

[45] June 8, 1976

[54] POLYOLEFIN-ELASTOMER COMPOSITIONS

[75] Inventors: Bernard Costemalle, Waterloo, Belgium; Arnold Cornelis van Ek, Westfield, N.J.

[73] Assignee: Exxon Research and Engineering Company, Linden, N.J.

[22] Filed: Feb. 4, 1974

[21] Appl. No.: 439,319

[30] Foreign Application Priority Data

Feb. 14, 1973  United Kingdom................. 7201/73

[52] U.S. Cl................................. 156/306; 156/309; 156/322; 156/311; 156/334; 260/889; 260/897 A; 428/517
[51] Int. Cl.² .......................... C09J 5/00; C09J 7/00
[58] Field of Search ........... 156/306, 334, 309, 337, 156/321, 338, 110 A, 244, 308, 285, 326, 311, 322; 260/888, 897 A, 889; 161/243, 240, 253; 117/139, 161 UZ, 161 A; 264/177 R; 296/93

[56] References Cited
UNITED STATES PATENTS

| | | | |
|---|---|---|---|
| 3,539,525 | 11/1970 | Raimondi...................... | 260/897 A |
| 3,639,189 | 2/1972 | Hartman............................ | 156/306 |
| 3,650,874 | 3/1972 | Job et al. ........................... | 156/309 |
| 3,758,643 | 9/1973 | Fischer .......................... | 260/897 A |
| 3,904,470 | 7/1975 | Fukuki et al....................... | 156/309 |

Primary Examiner—William A. Powell
Assistant Examiner—J. J. Gallagher
Attorney, Agent, or Firm—William T. Clarke; John J. Mahon

[57] ABSTRACT

A multilayer composition may be prepared by a process comprising applying an intimately mixed blend of a thermoplastic polyolefin and an elastomer to the surface of an elastomer and bonding said blend to said surface by heating and application of pressure. Thus a film of the intimately mixed blend may be applied to the surface of the elastomer.

Also a motor-car door seal can be produced by extruding to the desired profile the intimately mixed blend of thermoplastic polyolefin and elastomer so as to form the base foot and bonding the elastomer seal to the extruded section.

7 Claims, No Drawings

POLYOLEFIN-ELASTOMER COMPOSITIONS

This invention relates to blends of polyolefins and elastomers.

The use of vulcanised products based on non-polar elastomers, like IIR (butyl rubber), IM polyisobutylene or EPDM (ethylene-propylene terpolymers) is increasing more and more. Common applications are amongst others: waterproof sheeting, solid automotive or building sealing gaskets, sponge door seals etc. A major drawback in many applications is the difficulty of effecting adhesion of these types of vulcanisates due to their non-polar characteristics. This difficulty is true of butt or lapsplicing of the same material or of different materials.

Cured waterproof sheeting based on butyl or EPDM rubbers are usually joined together by hot-bonding the sheets with an uncured elastic tape which is cured in situ. This method requires expensive equipment as well as sophisticated uncured compounds, and is labour intensive.

Black elastic waterproof sheeting of IIR (butyl), IM polyisobutylene or EPDM (ethylene-propylene-diene) rubber is widely used, but there is a strong incentive to produce light-coloured sheeting. Mineral filled elastomer compounds are however relatively poor with regard to some physical properties such as tensile strength and tear resistance. They are usually much more expensive than the black compounds.

Solid weatherstrips used for automotive window sealings based on EPDM rubbers are normally joined together by transfer moulding compound onto both profile ends. This is a rather sensitive and expensive procedure.

At the moment automotive door seals are made of a metalreinforced plasticised PVC snap-on profile on which is adhered with an adhesive in solution the actual elastic door seal. This elastic seal can be a rubber solid or microcell profile of different designs. Although EPDM rubbers are ideal for this application because of their weather stability, it is difficult to make them adhere to a polar material such as PVC.

We have now discovered a composition which can be made to adhere to an elastomer such as butyl rubber. By this means black rubber can have a different coloured film melted onto its surface, and sheets or profiles of rubber can be spliced by hot melt bonding.

According to this invention multilayer compositions can be obtained by a process which comprises applying an intimately mixed blend of a thermoplastic polyolefin and an elastomer to the surface of an elastomer and bonding said blend to said surface by heating and application of pressure. Also, according to this invention an elastomeric composition comprises an intimately mixed blend of a thermoplastic polyolefin and an elastomer bonded to the surface of an elastomer.

In one preferred embodiment of the invention a layer or film of an intimately mixed blend of a thermoplastic polyolefin and an elastomer is applied to the surface of an elastomer, e.g. a layer of elastomer, and the layer or film is bonded to the surface of the elastomer by heating and application of pressure. By this process one obtains the layer or film of the blend of the thermoplastic polyolefin and an elastomer bonded to said surface of the elastomer.

In another preferred embodiment of the invention sheets of elastomer can be spliced by a process which comprises applying an intimately mixed blend of a thermoplastic polyolefin and an elastomer between the surfaces of two sheets of an elastomer and bonding the two sheets together by heating the sheets under pressure.

The thermoplastic polyolefin present in the blend of polyolefin and elastomer is usually either polyethylene or polypropylene but can be any thermoplastic polyolefin including polymers of mixtures of olefins. Particularly suitable is low pressure polyethylene which usually has a density of 0.94 to 0.96, and a molecular weight of from 30,000 to 500,000 as determined by the intrinsic viscosity method. This low pressure polyethylene is made by well-known polymerization methods using a Ziegler catalyst (e.g. $AlCl_3$ and $TiCl_4$). Another suitable polyolefin is low pressure isotactic polypropylene polymer which usually has a density of from 0.86 to 0.91, and a molecular weight of from 50.000 to 500,000 as determined by the intrinsic viscosity method. This low pressure polypropylene is made by similar methods as used for making low pressure polyethylene.

Other examples of thermoplastic polyolefins are ethylene/vinyl acetate copolymers.

The elastomer which is blended with the thermoplastic polyolefin can be for example butyl rubber, halogenated butyl rubber, EPDM, polyisobutylene, SBR (styrene-butadiene rubber), IR (isoprene rubber), NR (natural rubber) or NBR (nitrile rubber). Other rubbers may be used provided they have satisfactory compatability with polyolefins, e.g. ethylene-propylene copolymers.

Butyl rubber comprises a copolymer of major proportion, e.g. 85–99.9 wt.%, preferably 95–99.5 wt.% of a $C_4$–$C_8$ isoolefin such as isobutylene, with a minor proportion, e.g. 0.1 to 15 wt.% preferably 0.5 to 5 wt.% of a $C_4$–$C_{14}$ multiolefin, preferably a $C_4$–$C_8$ diolefin, such as butadiene, dimethyl butadiene, piperylene or isoprene. The preferred butyl rubber is obtained by reacting 95–99.6 wt.% of isobutylene with 0.5 to 5 wt.% of isoprene.

In producing halogenated butyl rubber unmodified, unvulcanized butyl rubber is halogenated, e.g. chlorinated or brominated so as to contain at least 0.5 wt.% and preferably at least 1.0 wt.% of combined halogen, but not more than one atom of chlorine and three atoms of bromine contained in the polymer per molecule of multiolefin present therein. Halogenated butyl rubber usually has a viscosity average molecular weight of between 150,000 and 1,500,000 and a mole per cent unsaturation of between 0.5 and 15%.

Ethylene-propylene-diene terpolymers are usually prepared by contacting a feed stream containing ethylene, propylene and polymerizable diolefin with a Ziegler catalyst in the presence of an inert saturated $C_5$ to $C_8$ hydrocarbon diluent, e.g. an alkane or cycloalkane such as n-pentane, isopentane, n-hexane, isohexane or n-octane. The copolymerization is usually carried out at a pressure of 1 to 5 atmospheres. The third polymerization olefin is usually a $C_6$ to $C_{16}$ non-conjugated diolefin, e.g. 1,5-hexadiene, 1,5-octadiene or a 2-alkyl norbornadiene.

The preferred polyisobutylene rubber has a Staudinger Mw of 45,000 to 150,000.

Styrene-butadiene rubber is usually made by the co-polymerisation of about 3 parts by weight of butadiene with 1 part by weight of styrene, the monomers being suspended in finely divided emulsion form in a large proportion of water in the presence of a detergent.

The blend of the thermoplastic polyolefin and elastomer should preferably contain a minor proportion by weight of the elastomer, e.g. 10–40 wt.%, preferably 20–30 wt.%.

To prepare the blend, the ingredients are intimately mixed together, e.g. in an internal mixer, and fluxed at above 150°C, e.g. 165°C, and cooled down. It can then be granulated, and then extruded and blown as a film e.g. of a thickness 75μ to 125μ, or extruded to a desired shape. Alternatively, the blends can be prepared continuously, for instance in high shearing extruders where the ingredients are fed continuously into the extruder.

At this stage it is convenient to add any pigment, e.g. titanium dioxide for a white colour, carbon black or any other colour to the blend, if a coloured surface is required. By adding different pigments one can obtain for example a straight colour or a marble effect. An embossed surface can be obtained by passing a sheet through an embossing machine.

The elastomer to the surface of which the above described blend of polyolefin and elastomer is applied usually has a flat surface. However the chemical composition of the elastomer is not restricted as regards this invention, and typical examples are those described above with respect the elastomer-containing blend. The elastomer used in the blend may or may not be the same as the elastomer to which the blend is bonded.

When it is desired to form a film or layer of the blend on the surface of the elastomer this is preferably carried out by calendering the film or layer onto the preheated surface of the elastomer. The elastomer surface should preferably be heated to a temperature of from 150° to 200°C, and the pressure should be from 1 to 10 Kg/cm², e.g. about 5 Kg/cm₂.

By ensuring that the film thickness is very small, e.g. about 50μ, the elastic properties of the elastomer, e.g. butyl rubber sheet, are not much affected.

When it is desired to splice layers or sheets of elastomer, the blend of thermoplastic polyolefin and elastomer should be applied between the overlapping parts of the layers or sheets. It is convenient for the blend to be applied in the form of a film, preferably of thickness 50μ–150μ. The overlapping parts are then heated, preferably under pressure. Suitable temperatures are 150° to 250°C, e.g. about 190°, and suitable pressures are 3–10 Kg/cm², e.g. about 5 Kg/cm².

Although not necessary, resins, tackifiers or oils may be added to the blend of polyolefin and elastomer, if desired.

In one application of this invention one can make motorcar door seals. It is found that if one replaces the hitherto used PVC by the intimately mixed blend of thermoplastic polyolefin and elastomer extruded to the desired profile to form the base foot one can bond the elastomer seal to the extruded section and a good adhesion is obtained. The base foot can have a metal inlay if desired.

In the following Examples various polyolefins and elastomers were used having the following properties

| High density polyethylene (HD-PE) | density = 0.956 |
| polypropylene (PP) | MFI (melt flow index) = 0.72 |
| | MFR (melt flow rate) = 0.8 |
| polyisobutylene (PIB) | Staudinger MW ~90,000 |
| ethylene-propylene- | Mooney viscosity ML 1+8, 127°C = 50 |
| diene (EPDM) | $C_2$ = 65 wt.% |
| | unsaturation = 3.7 wt.% |

EXAMPLE 1

Standard butyl rubber sheeting was spliced using the following procedure: A mixture of 75 wt.% HD-PE with 25 wt.% polyisobutylene (Vistanex L 140) was mixed in an internal mixer and fluxed at 165°C, cooled down, granulated and blown as a film of 100μ thickness.

This film was heated under pressure between 2 layers of commercial butyl sheeting of 15 mm thickness. The press temperature was 190°C, the press time 1 minute and the pressure applied 5 Kg/cm². The splice was then cooled below the film softening temperature under slight pressure (1–5 Kg/cm²).

This same procedure was repeated using the 100% HD-PE film of the same thickness. After 1 day the splice was tested under shear and peel conditions at 23°C and 70°C. Machine: Instrom tensile tester; speed: 50 mm/min; tested on strips of 25 mm width.

| | HD-PE | Blend HD-PE/PIB |
|---|---|---|
| Shear 23°C Kg/cm² | < 0.2 | butyl sheeting tearing |
| Peel 23°C Kg/cm | < 0.2 | 4.0 |
| Peel 70°C Kg/cm | < 0.2 | 2.4 |

The advantages of the present invention can be clearly seen from the above results.

EXAMPLE 2

Using a 100μ film made from 75 wt.% HD-PE and 25 wt.% EPDM in the same way as in Example 1, exactly the same results were obtained.

EXAMPLE 3

Using 100μ film made from 80 wt.% PP and 20 wt.% PIB exactly the same results as in Example 1 were obtained.

EXAMPLE 4

A film produced by the process of Example 1 of 50μ thickness was melted onto the surface of both ends to be spliced of a solid automotive EPDM weatherstrip. Both ends were then brought together and cooled below the softening temperature of the film under slight pressure (1–5 Kg/cm²).

When properly spliced, the adhesion obtained was better than the cohesive strength of the weatherstrip profile.

EXAMPLE 5

Example 4 was repeated, splicing the two ends of an EPDM microcellular profile. Equally satisfactory results were obtained.

EXAMPLE 6

The procedure of Example 4 was repeated splicing an EPDM microcellular profile onto a solid EPDM foot, as is used for doorseals. The adhesion obtained was better than the cohesive strength of the microcellular sponge.

EXAMPLE 7

A mixture of 75 wt.% HD-PE with 25 wt.% PIB and 15 wt.% titanium dioxide was mixed in an internal mixer and fluxed at 165°C. This blend was calendered onto a preheated commercial black butyl sheeting. The result was a glossy white surface.

EXAMPLE 8

A mixture of 75 wt.% PP with 25 wt.% PIB was mixed in an internal mixer and fluxed at 165°C. This blend was extruded with a cross-head extruder on the metal reinforcement. Immediately after the extruder heater, a preheated EPDM microcellular doorseal profile was pressed onto the molten surface of the blend. At the same time the foot of the blend was embossed with the desired pattern. The adhesion obtained was better than the structural strength of the sponge.

What is claimed is:

1. A process for preparing a multi-layer composition comprising the steps of:
   a. intimately mixing a blend of a thermoplastic polyolefin and an elastomer, said blend containing 10 to 40% by weight of elastomer, the polyolefin being low pressure polyethylene having a molecular weight of 30,000 to 500,000 or low pressure polypropylene having a molecular weight of 50,000 to 500,000 and fluxing the blend at a temperature greater than 150°C., and
   b. applying said blend to an elastomer surface which is preheated to 150° to 200°C. prior to application of said blend, and
   c. bonding said blend to said surface by heating said multi-layer composition to a temperature of from about 150° to 250°C. and applying a pressure of between about 1 and 10 kg/cm².

2. The process of claim 1 wherein the elastomer in the blend is polyisobutylene, EPDM or butyl rubber.

3. The process of claim 1 wherein the elastomer surface is butyl rubber or EPDM.

4. The process of claim 1 wherein the elastomer in the blend is a polyisobutylene having a Staudinger molecular weight of 45,000 to 150,000.

5. The process of claim 1 wherein in step (c) said pressure is applied until the blend is cooled below its softening temperature.

6. The process of claim 1 wherein said blend is applied as a film having a thickness of 50 to 150 microns.

7. The process of claim 1 wherein said pressure is from 1 to about 5 kg/cm².

* * * * *